UNITED STATES PATENT OFFICE.

FRED M. LOCKE, OF VICTOR, NEW YORK.

PROCESS FOR MAKING FELDSPAR FLUX.

No. 897,636.  Specification of Letters Patent.  Patented Sept. 1, 1908.

Application filed February 6, 1906. Serial No. 299,780.

*To all whom it may concern:*

Be it known that I, FRED M. LOCKE, of Victor, in the county of Ontario, in the State of New York, have invented new and useful Improvements in Processes for Making Feldspar Flux, of which the following is a full, clear, and exact description.

This invention relates to certain improvements in methods of preparing feldspar flux to be used in any manufacture in which such a flux may be desirable, such for instance, as in the manufacture of high potential porcelain insulators in which homogeneity, mechanical strength and electrical resistance are essential requirements.

Heretofore in the preparation of feldspar flux it has been customary to grind the natural feldspar to a fine power before firing or fusing and then adding such powder to the material to be fluxed or vitrified, but I have discovered that if the feldspar is first fired or fused, it is more easily ground, and may be more rapidly converted into a flux under a less degree of heat than is required to convert the same material when reduced to a powder before firing or fusing.

I have discovered that after fusing the feldspar it becomes extremely cellular, owing undoubtedly to the escape of the gases and foreign matter, leaving the fused material with innumerable minute cells which disappear in grinding, so that reduced to a powder and used as a flux for porcelain and similar material, it produces an inherent homogeneity which is greatly superior to that produced by flux which is only fused in the mixture. This superior tenacity or homogeneity gives to the porcelain body a high degree of mechanical strength and impenetrability by high potential electric currents and therefore, makes the porcelain valuable as an insulator for high potential electric conductors, especially where these insulators are subjected to widely varying climatic changes and severe mechanical and electrical strains.

The firing or fusing of the feldspar before grinding brings the fluxing properties closer together and makes it more easily broken up in the grinding process. The grinding process eliminates from the fused feldspar the cellular condition, which would otherwise be included in the porcelain body if it were used without fusing and grinding and therefore makes a stronger flux for closely knitting together the particles of kaolin and silica to resist puncture or disintegration from high potential electric currents. It is equally desirable in the manufacture of metal ingots and in other associations or mixtures where the feldspars may be useful.

The principal part of my inventions lies in the fusing or firing of feldspar and grinding before using as a flux for the purpose of eliminating the cellular condition, and making it easier to reduce to a powder, and also making it a more powerful flux by reduction, and capable of being more rapidly reduced as a flux under a lower degree of heat than would be required if the feldspar was ground and used before firing or fusing.

In the manufacture of this feldspar flux I may add a suitable amount of alkali or lime to increase its diffusive power, and in view of the fact that the feldspar already contains a greater or less amount of alkali or lime, but may be insufficient for the purposes required, my purpose is simply to add or increase such amount to bring the flux to a condition suitable for the use to which it is intended.

My improved process, therefore, consists broadly in first, firing or fusing the feldspar, cooling the same and then grinding this fired or fused mass either with or without the addition of an alkali or lime, ready for use as a flux with any material, such as porcelain or molten metal for causing a more homogeneous or cohesive knitting of the particles together, thereby producing a denser body than can be produced by grinding the feldspar before firing or fusing.

What I claim:

1. The method of preparing feldspar flux to be used in the manufacture of high potential porcelain insulators, said method consisting in melting, fusing and cooling the feldspar and then grinding it to a fine powder.

2. The herein described method of producing a feldspar flux to be used in the manufacture of high potential insulators, consisting in first firing the feldspar to the melting point and then cooling and reducing it to a finely comminuted condition.

3. A product of the herein prescribed process, said product consisting of finely powdered previously melted feldspar.

4. A flux for high potential porcelain insulators consisting of finely comminuted previously melted feldspar.

In witness whereof I have hereunto set my hand this 29th day of January 1906.

FRED M. LOCKE.

Witnesses:
W. A. HIGINBOTHAM,
C. A. MOORE.